W. E. HUNT.
METALLIC BELT CONVEYER.
APPLICATION FILED JUNE 18, 1918.

1,330,116.  Patented Feb. 10, 1920.
3 SHEETS—SHEET 1.

Witnesses

Inventor
William E. Hunt,
By
Attorney

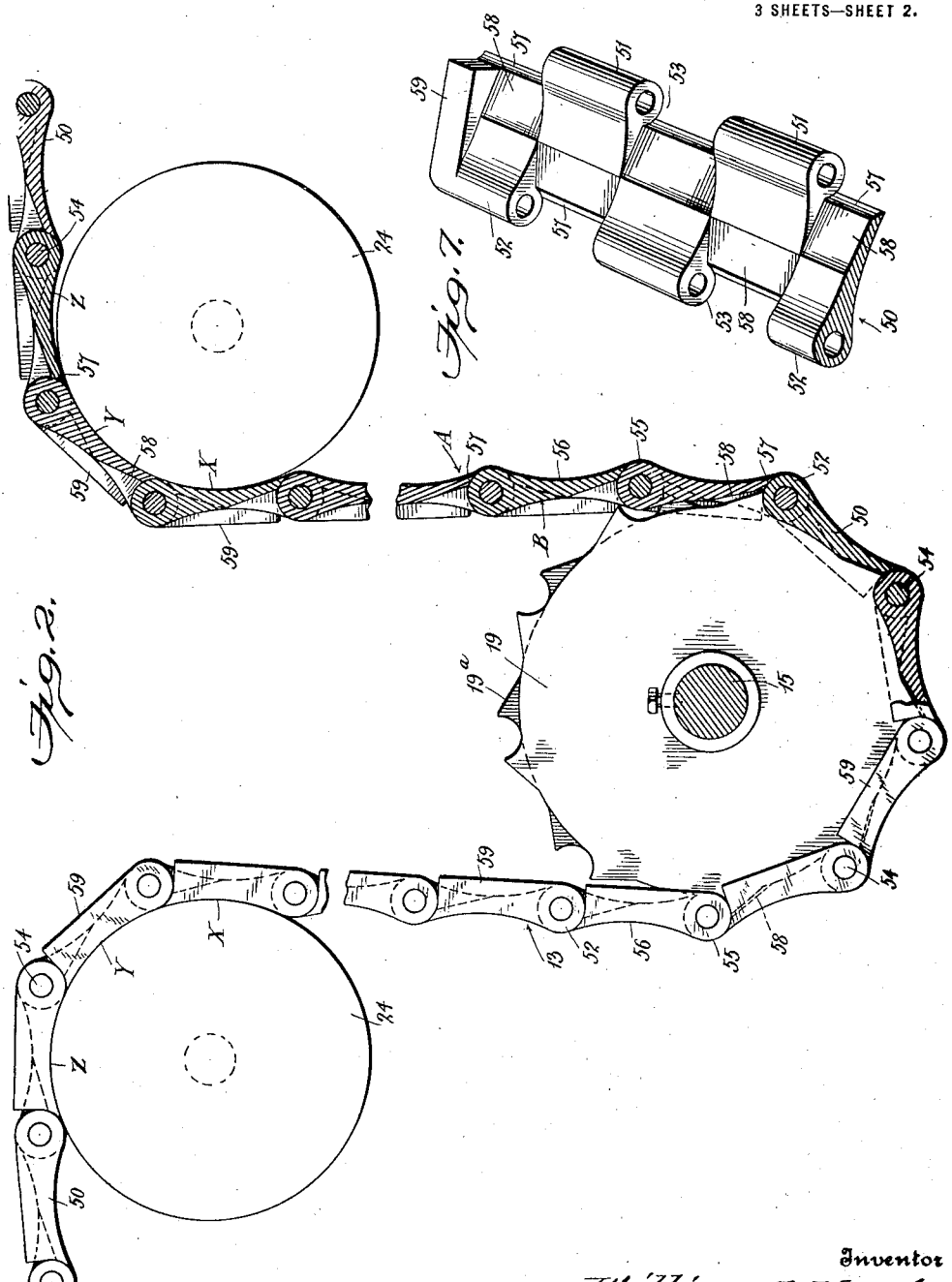

W. E. HUNT.
METALLIC BELT CONVEYER.
APPLICATION FILED JUNE 18, 1918.
1,330,116.
Patented Feb. 10, 1920.
3 SHEETS—SHEET 3.
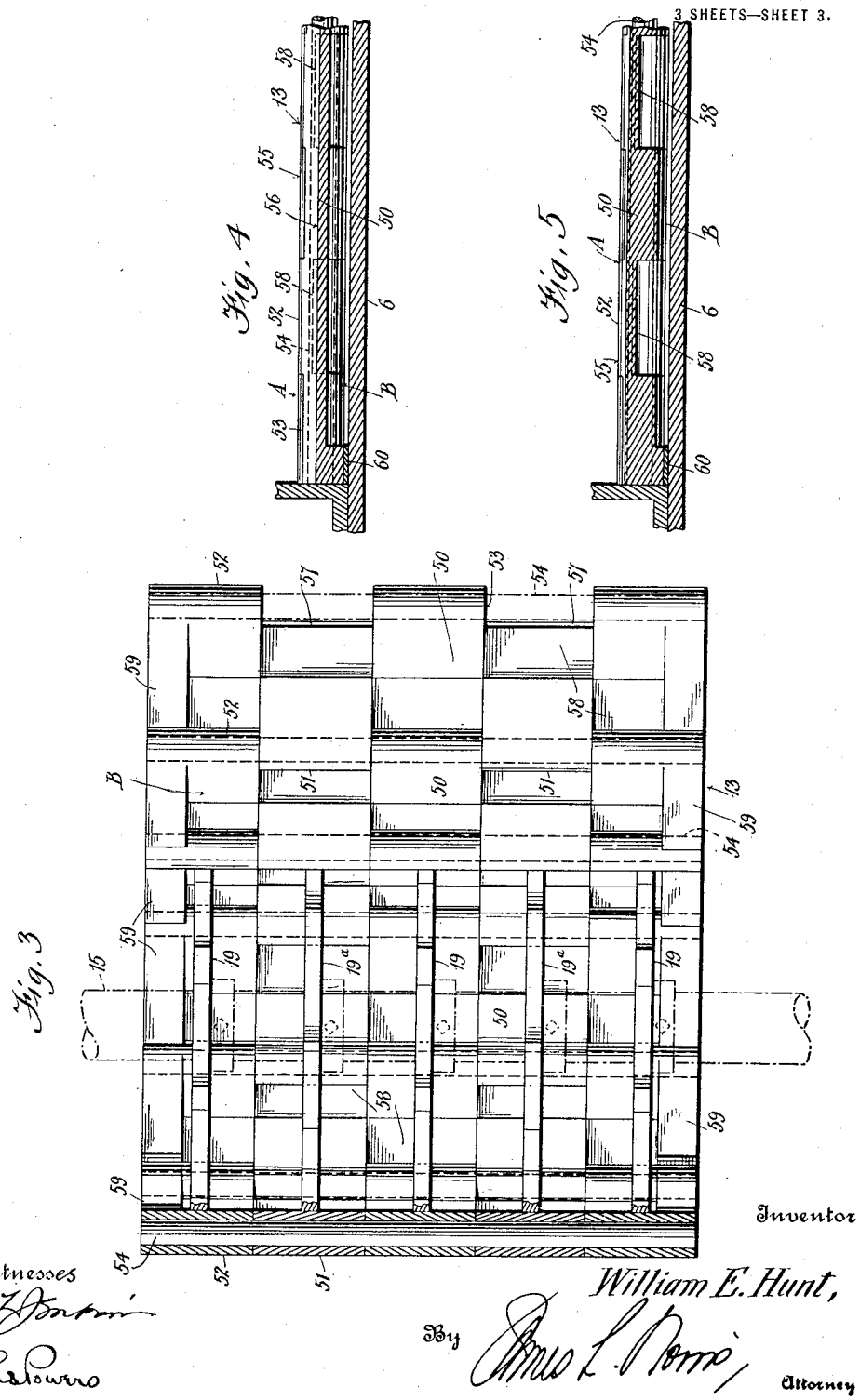

UNITED STATES PATENT OFFICE.

WILLIAM E. HUNT, OF OTTUMWA, IOWA, ASSIGNOR TO OTTUMWA BOX CAR LOADER CO., OF OTTUMWA, IOWA, A CORPORATION OF IOWA.

METALLIC BELT CONVEYER.

1,330,116.  Specification of Letters Patent.  Patented Feb. 10, 1920.

Application filed June 18, 1918. Serial No. 240,644.

*To all whom it may concern:*

Be it known that I, WILLIAM E. HUNT, a citizen of the United States, residing at Ottumwa, in the county of Wapello and State of Iowa, have invented new and useful Improvements in Metallic Belt Conveyers, of which the following is a specification.

This invention relates to an improvement in metallic belt conveyers, proposing a construction which is applicable for the transfer of material in bulk as in loading or unloading operations. The improved conveyer is especially adapted for use as an element of a car loader of the type disclosed in my Letters Patent No. 1,266,475 of May 14, 1918, but it may also be advantageously employed in various other environments and in connection with other material handling apparatus.

The principal objects of the invention, briefly stated, are to provide a metallic belt conveyer which shall be exceedingly flexible yet shall have great strength and a high degree of pronounced wear and stress resisting capacity, which shall operate with high efficiency in effecting the transport of the material, which shall be driven positively and with a highly efficient application of the driving force and may be susceptible of operative movement in either direction, which shall operate with a minimum of friction or of frictional binding among or between its elements, which shall avoid loss or leakage of the material, which may be manufactured at comparatively low cost, and which is readily adaptable to existing types of material handling machines.

With the above objects in view the invention consists generally in a conveyer belt made up of a plurality of transverse plates hingedly connected to one another and in certain novel features of form and relation appertaining to the plates and their hinge joints and which will be set forth in detail as the description proceeds.

The accompanying drawings illustrate a preferred embodiment of the invention, the same being shown, by way of example, as an element of a loader of the type disclosed in my said patent No. 1,266,475.

In the said drawings—

Fig. 2 is a view on a somewhat enlarged scale, partly in side elevation and partly in longitudinal section, showing details of the belt and its driving means.

Fig. 3 is a plan view of the structural features shown in Fig. 2.

Figures 1, 6:
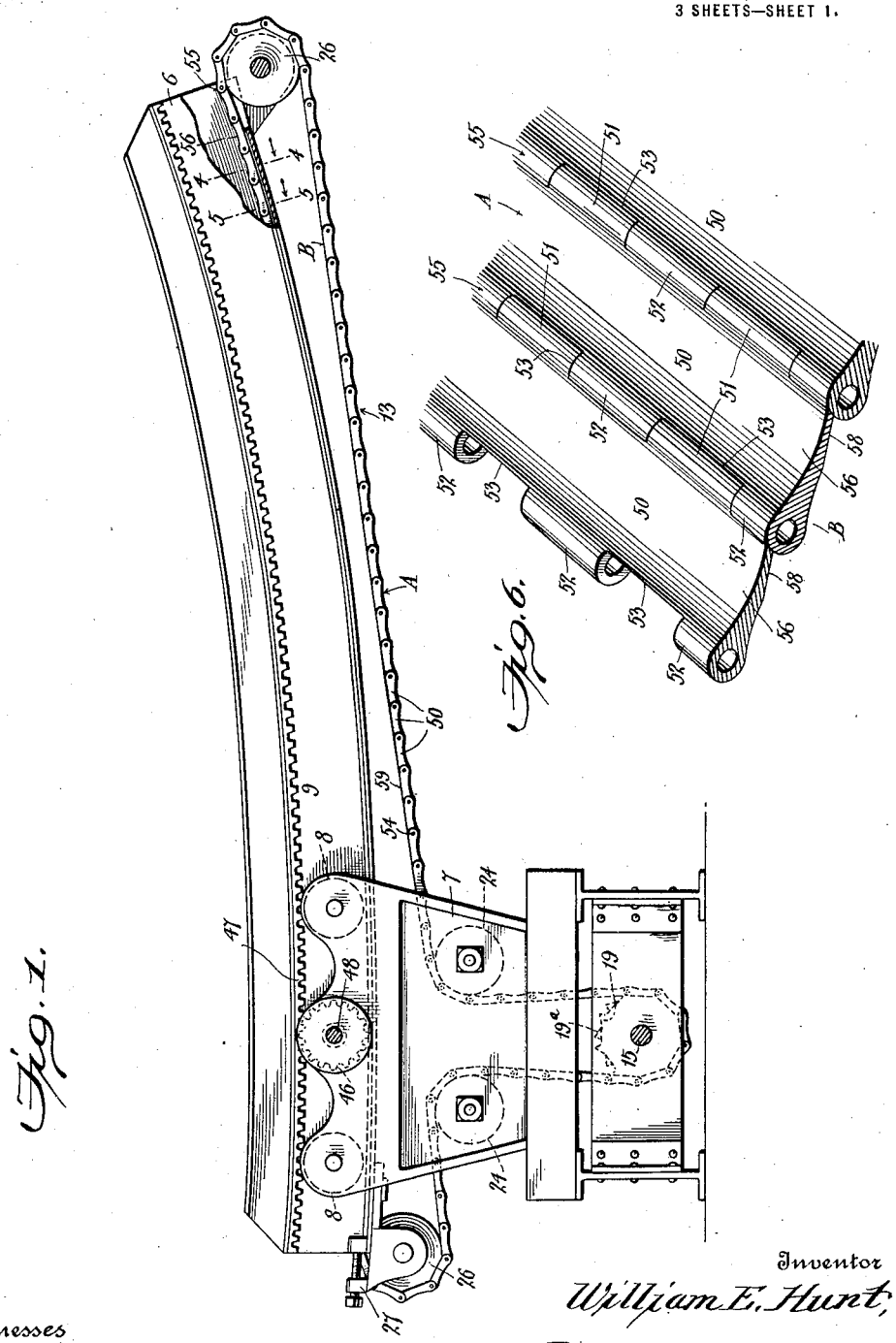
Figure 1 is a view, partly in section and partly in side elevation, showing the loader hopper and the belt of the present invention in its relation to said hopper and to its driving means.

Figs. 4 and 5 are cross-sectional views on the respective lines 4—4 and 5—5 of Fig. 1.

Fig. 6 is a sectional perspective view of a fragment of the belt.

Fig. 7 is a detail perspective view of one of the transverse plates which forms a unit of the belt structure, the said plate for convenience of illustration being shown in reverse position, *i. e.* with its under face presented upward.

Similar characters of reference designate corresponding parts throughout the several views.

The loader in connection with which the invention is disclosed is fully described and illustrated in my aforesaid patent No. 1,266,475 and requires no detail illustration or description in the present specification. It is, therefore, shown only in such detail as may be necessary to an understanding of the operation, as an element thereof, of the belt of the present invention. The parts of the loader illustrated are the trough-like hopper 6, the cradle 7 by which the hopper is supported for sliding movement, the rollers 8 carried by said cradle and which are the direct supporting elements of the hopper, the channeled guides 9 at the sides of the hopper and in which rollers fit, the rack 47 associated with one of the guides 9, the pinion 46 carried by the cradle 7 for coöperation with said rack to effect the lengthwise sliding movements of the hopper 6, the shaft 48 upon which said pinion is mounted, the loader main frame which carries the cradle 7 and the reversible main shaft 15 which is utilized for the operation of the material discharging means 13, such means in the present disclosure consisting of the belt which forms the subject of the invention.

The belt 13, in the embodiment disclosed, is driven in one direction by sprockets 19 and in an opposite direction by sprockets 19ª, mounted on the shaft 15; and said belt is guided and tensioned by idle rollers 24 carried by the cradle 7 and by other idle rollers 26 located at the ends of and below the floor of the hopper 6, one of the rollers 26 being preferably provided with a position adjusting device 27 for regulating the tension of the belt. Certain features of the invention, as will be hereafter set forth in detail, involve the construction of the belt for coöperation with the sprockets 19—19ª or either of them and also for coöperation with the idle rollers 24—26.

The belt 13 is composed of a plurality of transverse counter-part plates 50 which function as links, being arranged in immediate juxtaposition and hingedly connected to one another. The hinge joint between the plates is preferably and, as shown, of the piano hinge type and includes apertured beads 51 on one plate intermatching with similar beads 52 on an adjacent plate. Each plate, therefore, has a series of beads 51 along one edge, disposed transversely of the belt, and a series of beads 52, staggered with relation to the beads 51, along its opposite edge, the beads along each edge of the plate delimiting recesses 53 in which the beads of the adjacent plate fit. The hinge joint is completed by a hinge pin 54 which extends through the alining beads 51 and 52.

The material engaging or obverse face A of the belt is formed in a novel and peculiar fashion in order to insure the most effective transport of the material and is characterized by a succession of transverse and somewhat closely associated ridges 55 and intervening valleys 56, which are preferably gradually defined whereby the said material engaging face has a wave-like contour. The form of the plates 50 is selected to develop these physical peculiarities of the material engaging face of the belt. As preferred each plate 50 has its material engaging face concave in the longitudinal direction of the belt, i. e. in a direction at a right angle to the length of the plate itself, whereby the beads along the edges of the plates will form the ridges 55 and there will be a gradual rise to said ridges from the longitudinal centers (transverse to the belt) of the plates, the valleys 55 being deepest along said longitudinal centers. The ridges 55 and valleys 56 insure that the belt shall have an effective "grip" on the material being transported whether said material be finely divided, such for example, as sulfur lime or crushed rock, or whether it be lumpy, such for example, as coal; and the grip of the belt on the material is effected even when the movement of the material bearing face of the belt is in a curved path or in a path having one or more components disposed at an angle to a horizontal plane. In this respect the belt is especially adaptable as an element of a loader of the type above referred to wherein the floor of the hopper 6 is curved from end to end of said hopper and the hopper is slidable in a curved path or as an element of other material handling apparatus wherein it is required or desirable that the material bearing portion of the conveyer shall have a component of its path of movement disposed at an angle to a horizontal plane.

The plates 50 are so formed and related to one another that lodgment or deposit on said plates of the material under transport as also the leakage of the material between the plates is avoided while at the same time the belt may flex without any appreciable binding within the hinge joints of the plates. As regards the embodiment disclosed, these results are due, in part, to the gradual outline of the ridges 55 and valleys 56, in part to the utilization of the beads of the hinge joints to provide the ridges 55 and in part to the capacity of the hinge joint to permit of all requisite freedom of play of the plates relatively to one another as an incident of the flexure of the belt without presenting any interstices of such degree or form as would permit of the leakage of the material, if of finely divided character, between the plates.

The outstanding characteristics of the particular hinge joint disclosed are the cylindrical form of the beads 51 and 52, the arrangement of said beads whereby their axes lie substantially in the central plane of the plate on which they are formed, the right angular relation between the end faces of said beads and the bases of the recesses 53 and the close fit of the beads in the recesses 53. A further important advantage of the hinge joint in the preferred construction thereof disclosed in that the bases of the recesses 53 are fashioned to hug and have a conforming, somewhat extensive, bearing against the beads which fit in said recesses. For these purposes the bases of the recesses 52 are concave, as at 57, through a suitable arc to which the cross-sectional curvature of the beads 51 and 52 conforms.

The concave form of the faces of the plates 50 which make up the face A of the belt is of further advantage in enabling the said plates to conform to the curvature of the rollers 24 incident to the flexure of the belt in connection with its movement over said rollers. This will be apparent from Fig. 2 which shows three of the plates, identified as X, Y and Z, under flexure by means of the rollers 24 and whose faces, forming parts of the face A of the belt, conforms with substantial exactness to the peripheries of the rollers 24. The rollers thus exercise their guiding and tensioning functions with uniformity of effect, with easy bending moments of the plates 50 and with a minimum of frictional resistance to the movement of the belt. For the same purpose and advantage the faces of the plates 50 which make up the reverse face B of the belt are concaved similarly to the faces of said plates which make up the material engaging face A, like effects being produced by the concave units of the face B in connection with the flexure of the belt by the rollers 26 at the ends of the hopper 6.

An important advantage of the invention is the capacity for utilizing the belt itself for direct coöperation with the sprockets, whereby the belt may be positively driven, special sprocket chains with their attendant complexities are eliminated, and a highly efficient application of driving power is achieved. For these purposes the beads of the hinge joints are utilized as abutments for engagement by the teeth of the driving sprockets, this result being achieved by the provision of recesses 58 in the sprocket engaging face of the belt, such face in the embodiment disclosed being the reverse face B. The recesses 58 are disposed longitudinally of the belt and extend to the hinge beads which are to be utilized as abutments—that is to say, said recesses 58 extend to the recesses 53 with which they aline in the longitudinal direction of the belt; and the teeth of the driving sprockets enter the recesses 58 and engage as abutments the beads which occupy the recesses 53 to which said recesses 58 extend. Where, as in the embodiment disclosed, provision is to be made for the movement of the belt in either direction, the recesses 58 will be located along both of the edges, transverse to the belt, of each plate 50. While the recesses 58 may be arranged at any desired intervals transverse to the belt, it is preferred that they shall conform in number and arrangement to the recesses 53 and that a corresponding number of driving sprockets shall be provided. In this way, for the drive of the belt in one direction, all the beads 51 or 52, as the case may be, throughout the width of the belt are utilized for the application of driving power and the number of beads so utilized as also the number of sprockets for coöperation with said beads may be selected to bear a definite relation to the width of the belt, a greater number of driving sprockets and coöperating abutment-beads being employed as the belt may be of greater width and a less number of driving sprockets and coöperating beads being employed as the belt may be of less width. It will be manifest that where the width of the belt is relatively considerable three or more driving sprockets may be employed to effect the movement of the belt in one direction, thereby enabling the application of driving power in a like number of planes located at intervals, preferably equidistant, throughout the width of the belt. Where provision is to be made for the drive of the belt in both directions it is preferred that the sprockets which drive the belt in one direction shall be located in alternation to the sprockets which drive the belt in the opposite direction, such an arrangement being shown as applied to the sprockets 19 and 19ª in the embodiment disclosed.

In the construction preferred the belt has at its sides and along its face reverse to its material engaging face longitudinally disposed lugs 59 which extend between the hinge connections of the respective plates and contact with wear strips 60 arranged on and at the sides of the floor of the hopper or other element along which the material bearing portion of the belt moves. The lugs 59 and strips 60 co-act whereby the raised portions of the face B, i. e. the hinge beads in the embodiment disclosed, are held spaced from the floor of the hopper, thereby to minimize friction and wear. In connection with the provision of the lugs 59 the rollers 26 are preferably made of less length than the plates 50 in order that said lugs may adjoin the end faces of said rollers and may lie beyond the peripheries thereof.

Having fully described my invention I claim—

1. A metallic belt conveyer comprising a plurality of transverse plates hingedly connected along their adjacent edges, each plate having both of its faces formed with lengthwise concave depressions lying centrally between the adjacent connected edges and having hinge beads along said edges in raised relation to said depressions, the said conveyer having its faces, by virtue of said depressions and hinge beads, similarly characterized by a succession of gradually defined transverse ridges and intervening valleys, a group of said plates by virtue of said depressions being conformable during the bending moments of the conveyer to guide rollers therefor and one of the faces of the conveyer functioning as a material-engaging face.

2. A metallic belt conveyer comprising a plurality of transverse plates having apertured hinge beads in staggered relation along their opposite edges, the axes of the beads of each plate lying substantially in the central plane of the plate, each plate having recesses between the adjacent hinge beads along each edge, the beads of one plate intermatching and alining transversely with the beads of an adjacent plate and hinge pins passed through the alining beads, said recesses having their bases concave to conform to, hug and have a somewhat extensive bearing against the hinge beads, said plates having other recesses along one face of the belt which extend to said first named recesses and enable the hinge beads fitted therein to function as abutments for coöperation with driving sprockets.

3. A metallic belt conveyer comprising a plurality of transverse plates hingedly connected along their adjacent edges, said plates having wear lugs at their ends which extend longitudinally along the face of the belt reverse to the material engaging face and also extend transversely of the plates between the hinge connections thereof.

4. A metallic belt conveyer comprising a plurality of transverse plates hingedly connected along their adjacent edges, the said plates having their opposite faces concave in the longitudinal direction of the belt whereby their hinge joints form transverse ridges.

5. A metallic belt conveyer comprising a plurality of transverse plates hingedly connected along their adjacent edges, the said plates having their opposite faces concave in the longitudinal direction of the belt whereby their hinge joints form transverse ridges, and having recesses along one face of the belt whereby the beads of said hinge joints may function as abutments for coöperation with driving sprockets.

In testimony wherof I have hereunto set my hand in presence of two subscribing witnesses.

WILLIAM E. HUNT.

Witnesses:
W. F. MAURER,
MARIE ROBISON.